Dec. 20, 1949 V. KLÍMA 2,491,568
CIRCUIT CONNECTION FOR THE COMPENSATION
OF SHUNT MULTIPHASE COMMUTATOR MACHINES
Filed Feb. 14, 1948 4 Sheets-Sheet 2

Inventor:
Vilém Klíma,
by Paul H. Smolka

Patented Dec. 20, 1949

2,491,568

UNITED STATES PATENT OFFICE 2,491,568

CIRCUIT CONNECTION FOR THE COMPENSATION OF SHUNT MULTIPHASE COMMUTATOR MACHINES

Vilém Klíma, Prague, Czechoslovakia, assignor of one-half to Moravian Electrical Engineering Works, National Corporation, Olomouc, Czechoslovakia Application February 14, 1948, Serial No. 8,439
In Czechoslovakia September 20, 1946

Section 1, Public Law 690, August 8, 1946
Patent expires September 20, 1966

8 Claims. (Cl. 318—244)

This invention relates to A. C. shunt commutator type dynamo-electric machines of the type having compensating voltages introduced into the armature and, more particularly, to improved means for regulating the speed and other values of such motors over a wide range.

The speed of multiphase shunt commutator motors decreases rapidly with load, particularly in the sub-synchronous speed range, which is an undesirable characteristic for many applications. Additionally, their overload capacity is very small, with the stator and rotor currents rising to excessive values.

By applying constant potentials to the rotor, the currents may be kept small for certain loads, but, with every change in load, the current values change again considerably and, when the load is reduced, reach values which, though capacitative in effect, are undesirably high. These drawbacks may be avoided by inserting additional capacitance into the motor through the armature commutator, but this solution is unduly expensive due to the difficulty of properly regulating the capacitive reactance.

The only known practical solution has been the use of phase compensation by applying a constant potential through the commutator and suitably shifting the brushes. If the speed regulation and phase compensation are effected by separate regulators, accurate regulation is difficult. Changes effected by one regulator influence the values controlled by the other regulator. For example, if the phase compensation is increased by its regulator, the speed is also increased, which brings into action the speed regulator, and vice versa. This is particularly disadvantageous with automatic regulation, due to the difficulties of automatically controlling and interrelating the action of two regulators.

In accordance with the present invention, voltage components are introduced into the rotor or armature circuit in addition to the usual regulating voltage component. Thus, there are applied to the armature a constant voltage component for regulating the no-load speed, and a variable voltage component which, at low sub-synchronous speeds has primarily a compensating effect. This latter component is automatically varied with change in speed so that, with an increase in speed above the set value, it is reduced in magnitude and is changed in phase. At high super-synchronous speeds, this variable component is primarily a regulating voltage of small magnitude. Means are provided for setting the magnitude of this corrective voltage within wide limits at any speed setting.

With the foregoing in mind, it is an object of the present invention to provide the improved means for regulating multiphase commutator type A. C. dynamoelectric machines.

Another object is to provide such means including means for applying to the motor armature a regulating voltage which is automatically varied in magnitude and phase in accordance with motor speed.

A further object is to provide such means also including means for applying to the armature a constant voltage in accordance with the set no-load speed.

These, and other objects, advantages and novel features of the invention will be apparent from the following description and the accompanying drawings.

Figure 2:
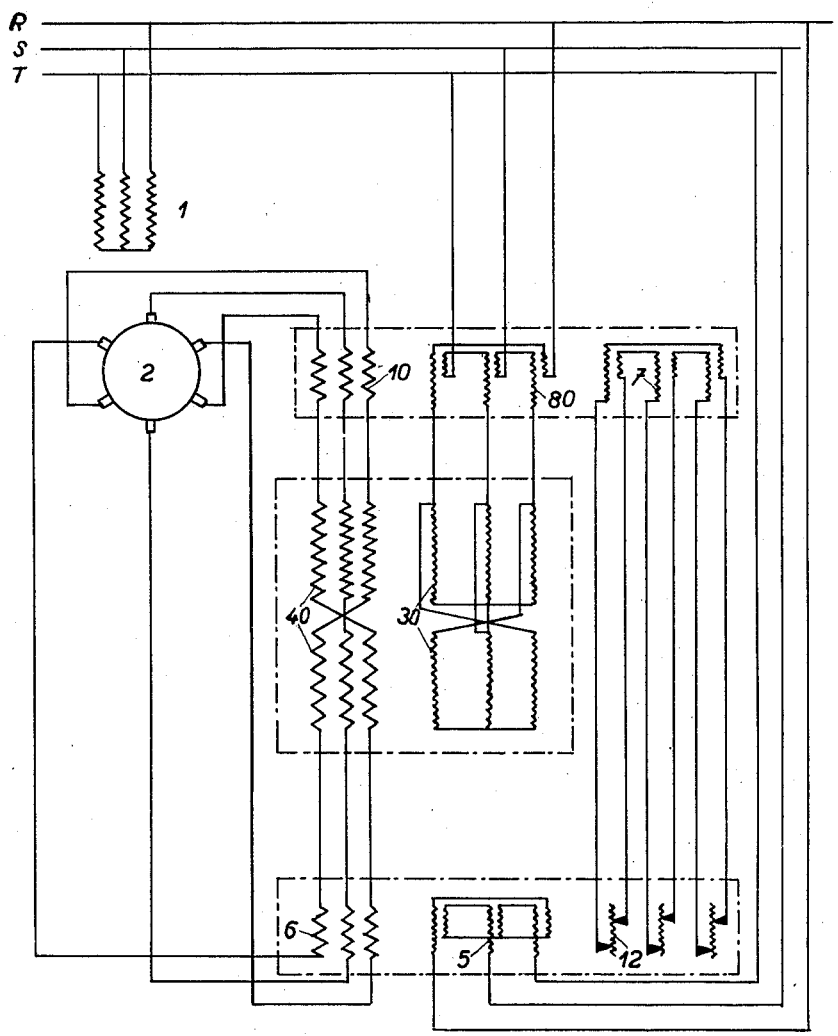
Fig. 2 is a schematic wiring diagram of another embodiment in which a double induction regulator and a pair of transformers, one of which is regulable, are connected to the armature.
Figure 3:
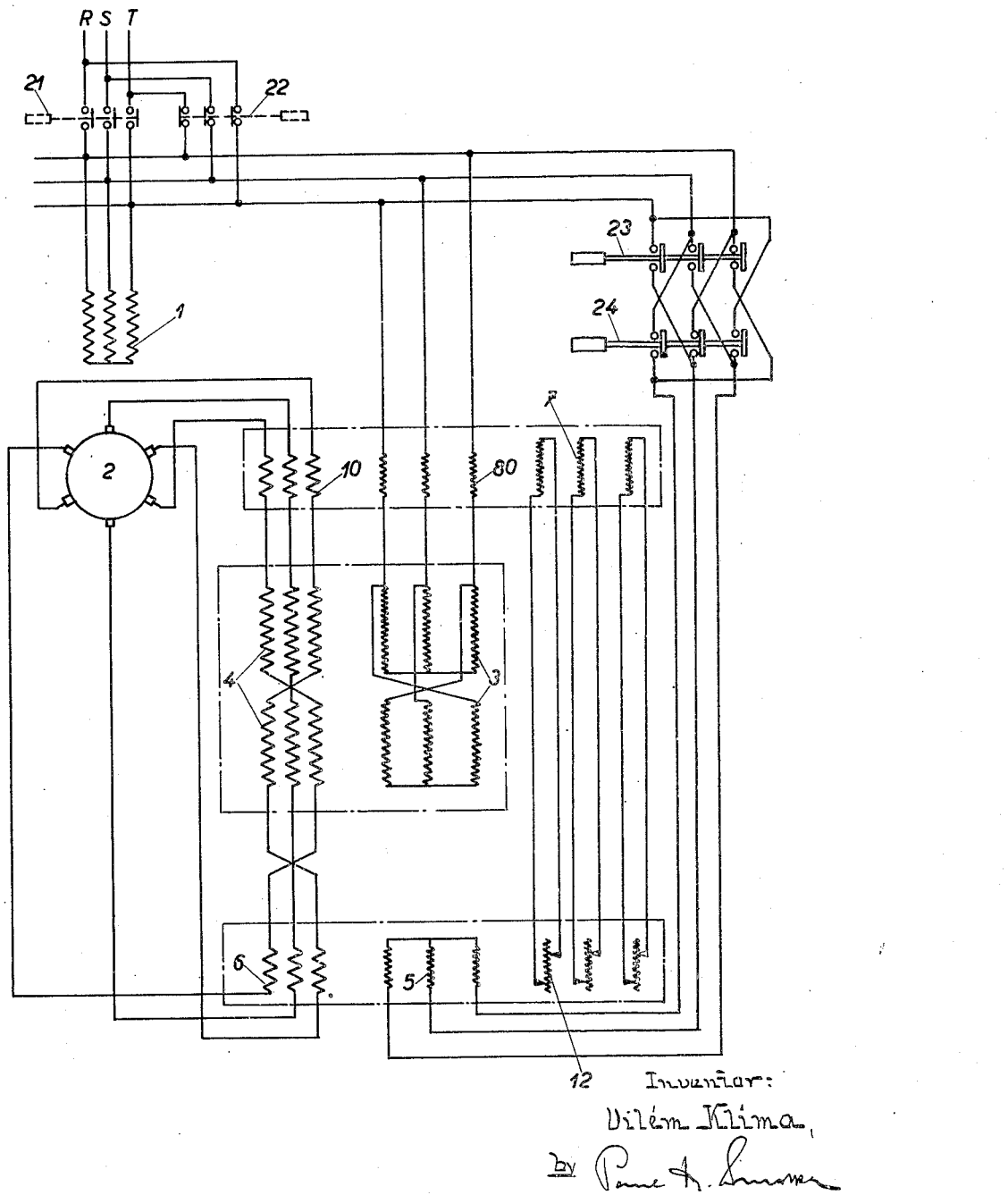

Fig. 3 schematically illustrates the embodiment of Fig. 2 as arranged for reversible operation.

Figure 4:
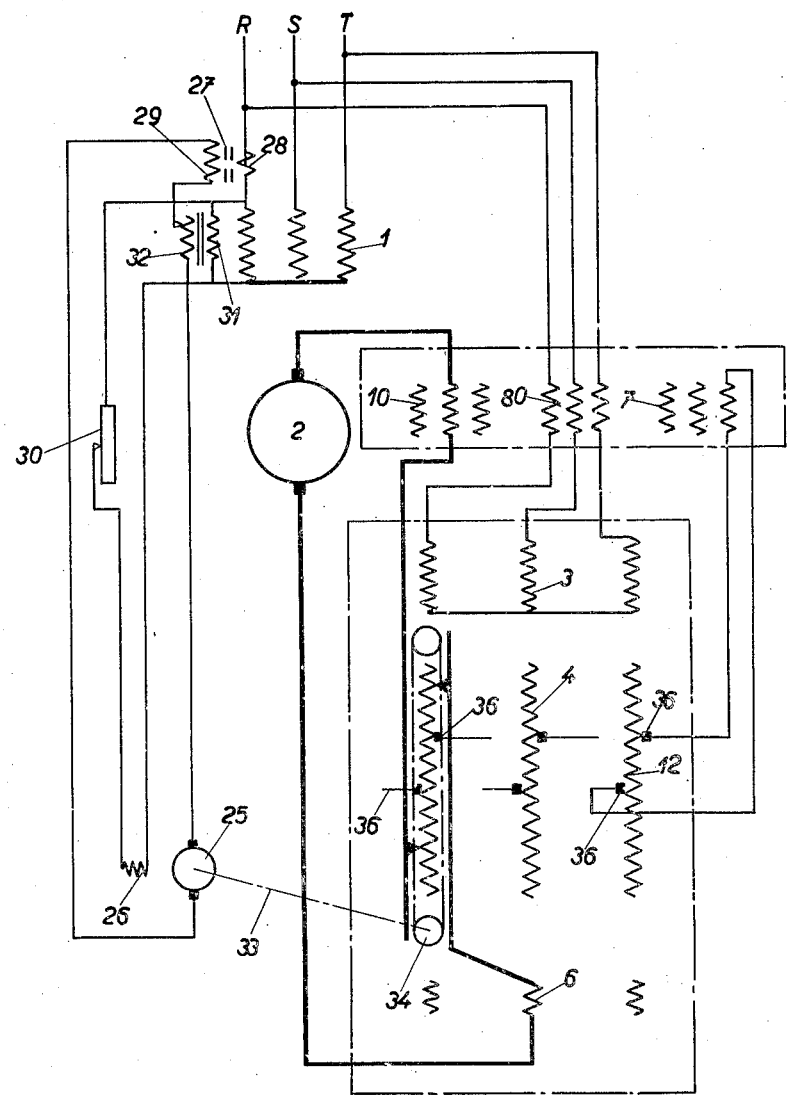

Fig. 4 is a schematic wiring diagram of a further embodiment having two regulating transformers in circuit with its armature, one transformer automatically regulating the phase compensation to produce an approximately wattless regulating current.

Figure 1:
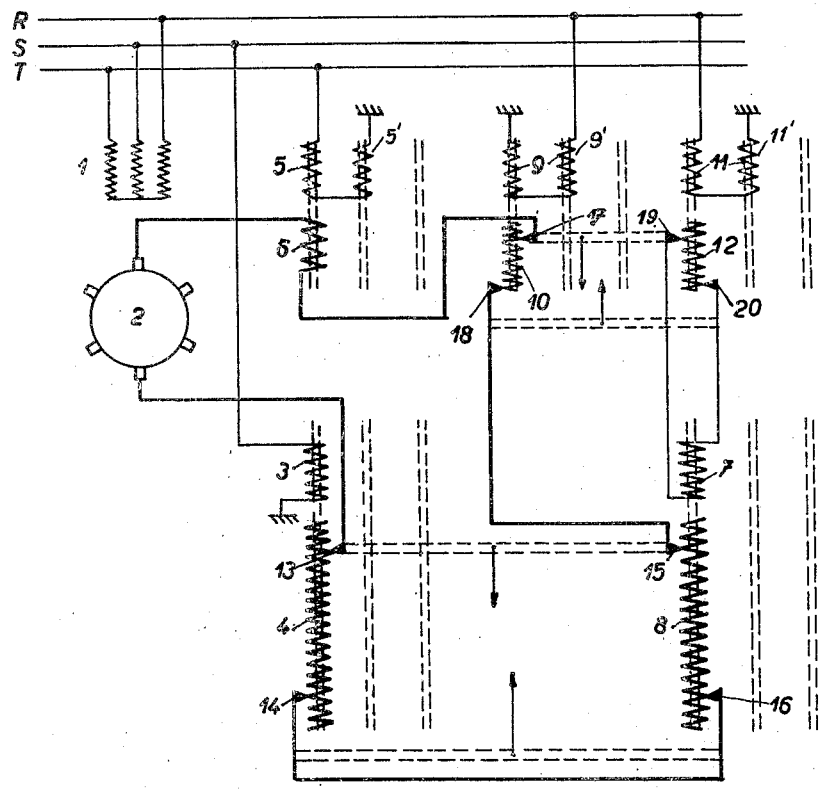
Fig. 1 is a schematic wiring diagram of the one embodiment of the invention as applied to a three-phase shunt commutator motor having five transformers in circuit connection with its armature, four of which are regulating transformers.

Referring to Fig. 1, a three-phase shunt commutator motor is illustrated as including a stator 1, connected to supply lines R, S, T, and a rotor 2 having six commutator brushes. To simplify the illustration, only the connections for one pair of brushes are shown, but actually there are three armature connected circuits spaced 120° from each other. The five transformers having windings 3 and 4, 5 and 6, 7 and 8, 9 and 10, and 11 and 12. The transformer 5—6 has a constant transformation ratio, whereas the other four transformers have an adjustable or variable transformation ratio.

Windings 3, 5, 9 and 11 are connected to the supply lines R, S, T, and windings 4, 6, 8 and 10 are connected in circuit with rotor or armature 2. Each winding 5, 9 and 11 is in series circuit relation with a winding 5′, 9′ and 11′, respectively, on another core so that the voltages induced in windings 6, 10 and 12 will have a preselected phase displacement. Winding 7 has its potential applied from winding 12.

A pair of brushes 13, 14 are arranged to adjust the number of turns of winding 4 connected in circuit with rotor 2, and a pair of brushes 15 and 16 adjust the number of turns of winding 8 connected in circuit with winding 10. The effective turns of winding 10 are adjusted by brushes 17, 18, and those of winding 12 by brushes 19, 20.

Brushes 13 and 15 are mechanically interconnected for simultaneous movement, as are also brushes 14 and 16. These two pairs of brushes are further mechanically interconnected for simultaneous adjustment so that the brush pair 13—15 always moves in a direction opposite to the movement of brush pair 14—16. Similarly, brushes 17—19 move as a unit, as do brushes 18—20. These two units are likewise mechanically interconnected for simultaneous adjustment in opposite directions. The movements of brushes 17—18—19—20 is independent of that of brushes 13—14—15—16. The several mechanical interconnections are indicated by broken lines and by arrows.

Adjustment or regulation of winding 4 effects the desired speed regulation, whereas adjustment of windings 10 and 12 effects the phase compensation adjustment and change in speed with change in load.

In accordance with the invention, the adjustment of the compensation regulating transformers is made dependent upon the difference between the preset speed and the no-load speed, the latter being preselected by adjustment of windings 3—4. The brushes 17, 18, 19, 20 of windings 10 and 12 can be automatically positioned by a tachometer dynamo driven by rotor 2 and having its voltage compared with a fixed voltage set by a potentiometer or the like. Alternatively, a relay and servomotor may be used to adjust these brushes. With decreasing speed, the compensating voltage is increased to restore the speed to its present value. Thus, it is possible to maintain the speed at the value preset by adjustment of windings 3—4, without the motor current becoming excessive. Due to the large adjustment range of windings 10, 12, accurate control of the speed, without hunting, can be accurately maintained.

Another manner of effecting the automatic brush positioning is through the use of wattless, or out of phase current as the adjustment control factor. With the wattless current having a preset value at the preselected speed, a wattmeter relay may be used to control the brush movement. This relay can be arranged to adjust the brushes to increase the compensating voltage with an increase of wattless current, and vice versa. Instead of the regulating transformers of Fig. 1, double induction regulators may be used.

Fig. 2 shows a modification of the arrangement of Fig. 1 in which winding 12 is arranged on the same core with windings 5 and 6, and the speed selecting transformer 3—4 is replaced by a double induction regulator 30—40. Windings 5, 6 and 12 constitute a three-phase transformer, with windings 7 in circuit with windings 12 and windings 40 in circuit with windings 6. Windings 40 are also in circuit with windings 10, and the latter, as well as windings 6, are connected to the brushes of rotor 2. Windings 7, 10 and 80 constitute another three-phase transformer, with winding 80 connected between supply lines R, S, T, and winding 30. Winding 5 is also connected to supply lines R, S, T.

The variable phase compensation voltage component is induced in windings 7, having their potential supplied by windings 12. The same result is achieved as in Fig. 1, and in a somewhat simpler manner than by the automatically regulated transformer 7—8 of Fig. 1.

Fig. 3 illustrates the arrangement of Fig. 2 as adapted for reversal of rotation. Switches 21, 22 control the connection of stator 1 to lines R, S, T for each direction of rotation, and switches 23, 24 control the connection of transformer primary windings 5 for reverse rotations. For motor operation in one direction, switches 21 and 22 are closed, and for generator operation, switch 24 is closed also. For reverse rotation, switch 23 is closed, and for motor operation, switch 24.

In the arrangement of Fig. 4, windings 6 and 12 are arranged in the same transformer as windings 3 and 4, and windings 4 and 12 may, in practice, be one set of winding. While the phase compensation voltage is, to some extent, dependent on winding 80, this is not disadvantageous and is of value with regulation based upon wattless current values. The embodiment of Fig. 4 is controlled by such wattless current values.

A small, single phase commutator motor having an armature 25 and a field 26 is arranged to drive a wheel 34 through a shaft 33. A cord 35 extending over wheel 34 carries brushes 36 which adjust the number of effective turns of windings 12. Armature 25 has applied to it a potential proportional to the current of stator 1 of the controlled motor, as by means of a current transformer 27 having windings 28 and 29. Winding 28 carries the main stator current, and has a large air gap so that its ampere turns are high as compared to those of secondary winding 29. A constant voltage is applied in series with the variable voltage by a transformer 31, 32 and the phase of the constant voltage is so selected that the potential due to winding 29 is neutralized when a wattless current flows through winding 28.

Field 26 is connected to lines R, S, T, or to stator 1, through a regulator 30. Regulator 30 can be used to displace the phase of the field flux when the armature current is in quadrature, so that the auxiliary motor torque is equal to zero when in-phase current flows through stator windings 1. If the current in winding 28 increases, even though it is wattless, a voltage of variable magnitude but constant direction is produced in the circuit of armature 25, as well as a current having a definite phase displacement relative to such voltage.

When the wattless current of winding 28 changes, the phase difference of the field flux and armature current of the auxiliary motor also changes. The motor develops a torque in one direction or the other to drive the brush adjusting mechanism in a corrective direction.

While specific embodiments of the invention have been shown and described in detail to illustrate the application of the principles thereto,

I claim:

1. In a speed control system for a multiphase shunt commutator A. C. dynamo-electric machine having stator windings connected to a polyphase A. C. potential source, said system comprising, in combination first transformer means having a primary winding connected to the source and a secondary winding connected to the commutator, said secondary winding being adjustable in potential to preselect the no-load speed of the machine; second transformer means having a primary winding connected to the source and an adjustable potential secondary winding; control winding means inductively coupled to the circuit including the secondary winding of said first transformer means, the potential of said control winding means being controlled by the potential of the secondary winding of said second transformer means; and machine speed responsive means controlling the potential of the secondary winding of said second transformer means.

2. A system as claimed in claim 1 in which said control winding means includes a primary winding connected to the secondary winding of said second transformer means, and secondary winding in series circuit relation with the secondary winding of said first transformer means, and including means operable to conjointly adjust the potentials of the secondary windings of said first transformer means and of said control winding means.

3. A speed control system for a multiphase shunt commutator A. C. dynamo-electric machine having stator windings connected to a polyphase A. C. potential source, said system comprising, in combination a first polyphase transformer having a primary winding connected to the source, a first secondary winding connected to the commutator and a second secondary winding; machine speed responsive means controlling the potential of said secondary winding; a second polyphase transformer having a primary winding connected to said secondary winding, a first secondary winding connected to the commutator and a second secondary winding; and an induction regulator having a primary winding connected to said secondary winding of said second transformer and a secondary winding in series circuit relation with the first secondary windings of both transformers.

4. A system as claimed in claim 3 in which said regulator is a double induction regulator.

5. A system as claimed in claim 3 including switch means operable to reverse the connections of said first transformer primary winding to the source.

6. A system as claimed in claim 3 including first switch means operable to reverse the connections of said first transformer primary winding to the source; and second switch means operable to reverse the connections of the stator to the source.

7. A speed control system for a multiphase shunt commutator A. C. dynamo-electric machine having stator windings connected to a polyphase A. C. potential source, said system comprising, in combination a first polyphase transformer having a primary winding connected to the source, a first secondary winding connected to the commutator and a second secondary winding; means responsive to the flow of wattless current in the machine controlling the potential of said second secondary winding; a second polyphase transformer having a primary winding connected to said second secondary winding, a first secondary winding connected to the commutator and a second secondary winding; and an induction regulator having a primary winding connected to said second secondary winding of said second transformer and a secondary winding in series circuit relation with the first secondary windings of both transformer.

8. A system as claimed in claim 7 in which said responsive means includes an auxiliary motor having its armature inductively coupled to the stator of the machine and adjustable brush means associated with said second secondary winding of said first transformer and operatively coupled to said auxiliary motor.

VILÉM KLÍMA.

No references cited.